(12) United States Patent
Maki et al.

(10) Patent No.: US 7,307,033 B2
(45) Date of Patent: *Dec. 11, 2007

(54) METHOD FOR PRODUCING α-ALUMINA PARTICULATE

(75) Inventors: Hajime Maki, Niihama (JP); Yoshiaki Takeuchi, Niihama (JP)

(73) Assignee: Sumitomo Chemical Company, Limited., Osaka (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/785,083

(22) Filed: Feb. 25, 2004

(65) Prior Publication Data

US 2004/0186005 A1 Sep. 23, 2004

(30) Foreign Application Priority Data

| Mar. 4, 2003 | (JP) | ............................. 2003-056806 |
| May 19, 2003 | (JP) | ............................. 2003-139911 |
| Aug. 26, 2003 | (JP) | ............................. 2003-208791 |

(51) Int. Cl.
C01F 7/38 (2006.01)
(52) U.S. Cl. ...................... 501/127; 501/128; 423/625; 423/626
(58) Field of Classification Search ................ 501/127, 501/153; 423/625, 626
See application file for complete search history.

(56) References Cited

U.S. PATENT DOCUMENTS

| 4,314,827 A * | 2/1982 | Leitheiser et al. ............ 51/298 |
| 4,657,754 A | 4/1987 | Bauer et al. |
| 4,964,883 A * | 10/1990 | Morris et al. .................. 51/293 |
| 5,782,940 A * | 7/1998 | Jayan et al. ................... 51/309 |
| 5,935,550 A * | 8/1999 | Mohri et al. ................ 423/625 |
| 6,083,622 A * | 7/2000 | Garg et al. ................... 428/402 |
| 6,841,497 B1 * | 1/2005 | Krell et al. ................... 501/153 |
| 2002/0187097 A1 * | 12/2002 | Uchida et al. .............. 423/626 |
| 2003/0098529 A1 * | 5/2003 | Drumm et al. ............. 264/624 |
| 2004/0131856 A1 * | 7/2004 | Kajihara et al. ............ 428/407 |
| 2004/0197263 A1 * | 10/2004 | Wang .......................... 423/625 |
| 2005/0008565 A1 * | 1/2005 | Maki et al. ................. 423/625 |
| 2005/0201928 A1 * | 9/2005 | Maki et al. ................. 423/625 |
| 2005/0276745 A1 * | 12/2005 | Maki et al. ................. 423/626 |

FOREIGN PATENT DOCUMENTS

| DE | 19922492 A1 * | 11/2000 |
| DE | 10035679 A1 * | 1/2002 |
| WO | WO 00/69790 A | 11/2000 |
| WO | WO 02/08124 A | 1/2002 |

OTHER PUBLICATIONS

K. Kamiya et al., "Formation of α-Alumina Around 500° C. in Alkoxy-Derived Alumina Gels Under Ambient Pressure—Effects of Starting Solution Composition and Seeding", Journal of Sol-Gel Science and Technology, vol. 20, 2001, pp. 275-285.
Y. Takeda et al., "Crystallization Behavior of Alumina Gels Prepared by Sol-Gel Method Using Nitric Acid as a Catalyst", Journal of the Ceramic Society of Japan, vol. 110, No. 11, 2002, pp. 1025-1028.
H. Ma et al., "Synthesis and Processing of Nano-α-Al2O3 Powders", Key Engineering Materials, vol. 206-213, XP008025131, Sep. 9, 2001, pp. 43-46.
A. Pierre et al., "Gelation of Aluminum Hydroxide Sols", J. Am. Ceram. Soc., vol. 70, No. 1, 1987, pp. 28-32.
W.M. Zeng et al., "A New Sol-Gel Route Using Inorganic Salt for Synthesizing Al2O3 Nonopowders", NonoStructured Materials, vol. 10, No. 4, 1998, pp. 543-550.
Ph. Colomban, "Structure of oxide gels and glasses by infrared and Raman scattering", Journal of Materials Science, vol. 24, 1989, pp. 3002-3010.
Taichi Sato, "Aluminium Hydroxides and Aluminas", *Mineralogy Association Magazine*, vol. 19, No. 1, Mar. 1989, pp. 21-41.
A. Krell et al., "Nanocorundum—Advanced Synthesis and Processing", *NanoStructured Materials*, vol. 11, No. 8, 1999, pp. 1141-1153.
WPI Abstract WO 2000/069790, Nov. 2000.
S. Rajendran et al., "Fabrication of a Fine Grained Alumina Ceramic", *Key Engineering Materials*, vol. 53-55, 1991, pp. 462-468.
B. Felde et al., "Synthesis of Ultrafine Alumina Powder by Sol-Gel Techniques", 9th *Cimtec World Ceramics Congress*, Ceramics: Getting into the 2000's—Part B, P. Vincenzini (Editor), 1999, pp. 49-56.
Y. Ye et al., "Preparation of Ultrafine α-Al$_2$O$_3$ Powder by Thermal Decomposition of AACH at Low Temperature", *The Chinese Journal of Process Engineering*, vol. 2, No. 4, Aug. 2002, pp. 325-329, with English Abstract.

* cited by examiner

*Primary Examiner*—David Sample
(74) *Attorney, Agent, or Firm*—Sughrue Mion Pllc.

(57) ABSTRACT

A method for producing an α-alumina particulate is described. The method for producing an α-alumina particulate comprises steps of (Ia) and (Ib), or a step of (II):

(Ia) removing water from a mixture containing water, a seed crystal and a hydrolysate obtained by hydrolysis of an aluminum compound under conditions of a pH of 5 or less and a temperature of 60° C. or less,
(Ib) calcining the resulted powder,
(II) calcining a mixed powder containing 75-1 wt % of an α-alumina precursor (in terms of Al$_2$O$_3$) and 25-99 wt % of a seed crystal (in terms of oxide of metal component).

12 Claims, 2 Drawing Sheets

METHOD FOR PRODUCING α-ALUMINA PARTICULATE

BACKGROUND OF THE INVENTION

1. Field of the Invention

The present invention relates to a method for producing an α-alumina particulate. More particularly, the present invention relates to a method for producing an α-alumina particulate to provide a small amount of α-alumina particulate having necking.

2. Description of Related Art

α-alumina is alumina [$Al_2O_3$] in which crystal phase is α, and widely used as a raw material for producing a sintered body such as a translucent tube. As the method for producing α-alumina, there are known methods in which water is removed from an aqueous mixture prepared by dispersing an aluminum hydrolysate and a seed crystal in water to obtain a powder mixture containing an aluminum hydrolysate and a seed crystal, and the powder mixture is calcined. (A. Krell, NanoStructured Materials, Vol. 11, 1141 (1999)).

However, in the method described herein, obtained α-alumina has a large amount of particulate having necking, and it is difficult to produce a dense sintered body.

SUMMARY OF THE INVENTION

The present inventors have investigated a method for producing an α-alumina particulate and resultantly completed the present invention.

Namely, the present invention provides a method for producing an α-alumina particulate comprising steps of (Ia) and (Ib), or a step of (II) described below:

(Ia) removing water from a mixture containing water, a seed crystal and a hydrolysate obtained by hydrolysis of an aluminum compound under conditions of a pH of 5 or less and a temperature of 60° C. or less, (Ib) calcining the resulted powder, (II) calcining a mixed powder containing 75-1 wt % of an α-alumina precursor (in terms of $Al_2O_3$) and 25-99 wt % of a seed crystal (in terms of oxide of metal component).

DETAILED DESCRIPTION OF THE PREFERRED EMBODIMENTS

Figure 1:
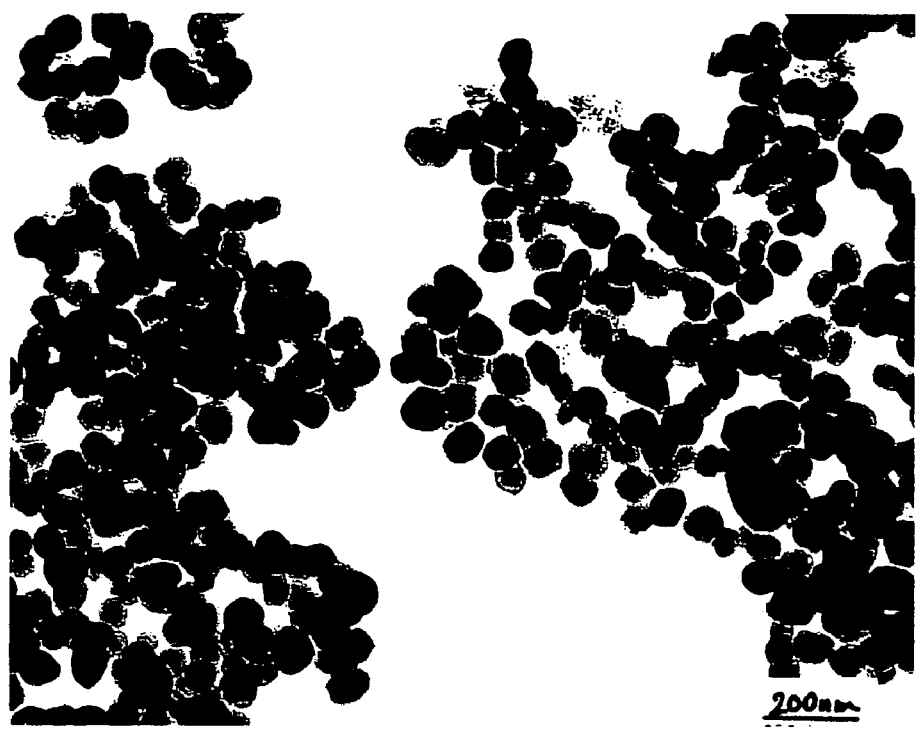
FIG. 1 shows a transmission electron micrograph of an α-alumina particulate obtained in Example 1.

Production Method I of the Present Invention

In the step (Ia), water is removed from a mixture containing water, a seed crystal and a hydrolysate.

The hydrolysate used in the step (Ia) is obtained by hydrolysis of an aluminum compound at a pH of 5 or less and a temperature of 60° C. or less.

The aluminum compound herein used is, for example, an aluminum salt or alkoxide. The aluminum salt includes an aluminum inorganic salt such as aluminum nitrate, aluminum sulfate, aluminum ammonium sulfate and ammonium aluminum carbonate hydroxide; and an aluminum organic salt such as aluminum oxalate, aluminum acetate, aluminum stearate, aluminum lactate and aluminum laurate, and preferably an aluminum inorganic salt, further preferably aluminum nitrate. The alkoxide includes, for example, aluminum isopropoxide, aluminum ethoxide, aluminum sec-butoxide and aluminum t-butoxide.

When the aluminum compound is an aluminum salt, it is advantageous that hydrolysis is conducted by reacting an aluminum salt with a base in the presence of water, and for example, an aluminum salt is dissolved in water to obtain an aqueous solution, and a base is added to this, or an aqueous solution obtained by dissolution of an aluminum salt is added to a base. The concentration of an aluminum salt in the aqueous solution is preferably about 0.01 mol/L or more and saturation concentration or less in terms of $Al_2O_3$ and pH is preferably 0 to 2. It is preferable that an aluminum salt is completely dissolved in water. The aqueous solution of aluminum salt may contain an organic solvent except water, and the solvent may be one which vaporizes or decomposes in calcination process described later, and examples thereof include polar organic solvents (alcohols such as methanol, ethanol, n-propanol, isopropanol) and non-polar organic solvents (carbon tetrachloride, benzene, hexane and the like). The base is a compound containing no metal component such as ammonia water, ammonia gas and ammonium carbonate, and preferably is ammonia water. The concentration of the base in this case is about 1 wt % to 50 wt %, preferably about 1 wt % to 25 wt %. The amount of the base is such that a slurry obtained by hydrolysis has a pH of 5 or less.

When the aluminum compound is an aluminum alkoxide, hydrolysis may be conducted, for example, by adding water having a pH of 5 or less to an aluminum alkoxide, or adding an aluminum alkoxide to water having a pH of 5 or less. In usual, water having a pH of 5 or less may be prepared by adding an acid (nitric acid or the like) to water.

Hydrolysis may be usually conducted under condition in which pH is 5 or less in completion, and it is preferable that pH is 5 or less from initiation to completion.

Hydrolysis is conducted at about 60° C. or less. The hydrolysis temperature is preferably about 50° C. or less, further preferably about 35° C. or less, and not lower than the freezing point of the above-mentioned aqueous solution, preferably about 0° C. or more.

An obtained hydrolysate may be subjected to aging. Aging may be conducted, for example, by maintaining a hydrolysate at temperatures of about 60° C. or less, preferably about 50° C. or less, further preferably about 35° C. or less and not lower than the freezing point of the above-mentioned aqueous solution, preferably about 0° C. or more, for about 1 hour or more, and about 72 hours or less.

Usually, a mixture containing a hydrolysate and water may be obtained by hydrolysis. The mixture has in form of a sol or gel, or contains a precipitate of a hydrolysate, since a hydrolysate may be insoluble in water.

The seed crystal contained in the mixture in the step (Ia) is, for example, a metal oxide such as alumina ($Al_2O_3$), iron oxide ($Fe_2O_3$) or chromium oxide ($Cr_2O_3$). The seed crystal is preferably a metal oxide having a crystal structure of corundum, and this metal oxide is, for example, α-alumina, α-iron oxide or α-chromium oxide, and preferably α-alumina.

The seed crystal has an average primary particle diameter of usually about 0.01 μm or more, preferably about 0.05 μm or more and usually about 0.5 μm or less.

The seed crystal has a BET specific surface area of usually about 12 m²/g or more, preferably about 15 m²/g or more and usually about 150 m²/g or less.

α-alumina used as the seed crystal may advantageously be prepared by, for example, a method in which aluminum hydroxide obtained by hydrolysis of aluminum isopropoxide is pre-calcined to obtain transition alumina, the obtained transition alumina is ground, and then, calcined and ground. Iron oxide and chromium oxide may be prepared, for example, by a method for grounding a commercially available product.

The weight ratio of a hydrolysate to a seed crystal [=hydrolysate (in terms of $Al_2O_3$)/seed crystal (in terms of oxide of metal component)] is 99-1 wt %/1-99 wt %, preferably 96-1 wt %/4-99 wt %, further preferably 75-1 wt %/25-99 wt %.

As the water contained in the mixture in the step (Ia), there are usually used pure water, ion exchanged water and distilled water. The amount of water is usually about 150 parts by weight or more, preferably about 200 parts by weight or more and usually about 1000 parts by weight or less, preferably about 500 parts by weight or less based on 100 parts by weight of the total amount of the hydrolysate and the seed crystal.

A method for preparation of a mixture containing the above-mentioned hydrolysate, seed crystal and water may be conducted, for example, by procedures in which (I-1) water and a hydrolysate is mixed, and a seed crystal is mixed into this, (I-2) water and a seed crystal is mixed, and a hydrolysate is mixed into this, (I-3) a seed crystal is mixed into water slurry containing a hydrolysate after hydrolysis, (I-4) an aluminum compound and a seed crystal are mixed, and the mixture is subjected to hydrolysis, and (I-5) water and a seed crystal are mixed, and this mixture is mixed with an aluminum compound, then, the mixture is subjected to hydrolysis. In these procedures, the procedure (I-4) is preferable. Mixing is advantageously conducted by using a vessel equipped with a stirrer, ball mill, vibration mill, medium stirring mill and the like. In mixing, organic dispersing agents, pH regulators, solvents miscible with water (methanol, ethanol, n-propanol, isopropanol and the like) may be added, if necessary.

Removal of water in the step (Ia) may be conducted by a method in which water contained in a mixture is evaporated to obtain dry solid, and it is usually conducted at about 100° C. or less. It is advantageous that removal of water is conducted, specifically, by a method such as a freeze drying and a pressure-reduced drying, or by a method in which water and solid are separated from a mixture by solid-liquid separation such as filtration and centrifugal separation, then, obtained solid is dried (by heat drying using a heat conductive type heater or thermostat, air drying and the like). Drying is conducted under air or an inert gas (for example, $N_2$, Ar), and its pressure is usually 1 atom or less.

A mixture obtained by removal of water in the step (Ia) is usually powdery, and contains a hydrolysate and a seed crystal.

The step (Ib) provides calcination of a powder obtained in the step (Ia).

It is advantageous that calcination is conducted, for example, by a method in which a powder is heated to calcination temperatures by using a tubular electric furnace, box-type electric furnace, tunnel furnace, far-infrared furnace, microwave furnace, shaft furnace, reflection furnace, rotary furnace, Roller Hearth furnace, and retained at the calcination temperature. Calcination may be conducted in a batch-wise or continuous. It may be conducted in static mode or flow mode. The calcination temperature is usually about 600° C. or more, preferably about 700° C. or more and usually about 1000° C. or less, preferably about 950° C. or less. The temperature raising rate from room temperature to the calcination temperature is usually about 150° C./h to 500° C./h, and a duration in which, after reaching the calcination temperature, its temperature is retained, namely, the calcination time is usually about 10 minutes or more, preferably about 30 minutes or more and usually about 24 hours or less, preferably about 10 hours or less. Calcination is usually conducted under air or an inert gas ($N_2$, Ar). Further, calcination may also be conducted under air in which partial pressure of water vapor is regulated, for example, air in which partial pressure of water vapor is about 600 Pa or less.

An α-alumina particulate obtained by calcination of a mixture may be ground. It is advantageous that grinding is conducted, for example, by using a medium pulverizer such as a vibration mill and ball mill, or an airflow pulverizer such as jet mill. Further, an α-alumina particulate obtained by calcination or an α-alumina particulate subjected to the above-mentioned grinding may be classified.

Production Method II of the Present Invention

In the step (II), a mixed powder containing an α-alumina precursor and a seed crystal is calcined.

The α-alumina precursor in the step (II) may be a compound becoming α-alumina by calcination described later, and examples thereof include the above-mentioned aluminum salts, aluminum alkoxides, transition alumina, aluminum hydroxide, hydrolysates of aluminum compounds and the like. The transition alumina is a compound for example in which a crystal phase is γ, χ, θ, ρ or κ. The aluminum hydroxide is amorphous compound or a crystalline compound in which a crystal phase is gibbsite, boehmite, pseudo-boehmite, bayerite, norstrandite or diaspore. As the hydrolysate of an aluminum compound, the same compounds as the above-mentioned hydrolysates in the step (Ia) are used.

The seed crystal in the step (II) may be that promoting phase transformation from an α-alumina precursor to α-alumina in calcination described later, and it is usually a metal compound, and examples thereof include alumina ($Al_2O_3$), iron oxide ($Fe_2O_3$) and chromium oxide ($Cr_2O_3$). The seed crystal is preferably a metal oxide having corundum crystal structure, and the metal oxide is, for example, α-alumina, α-iron oxide or α-chromium oxide, preferably α-alumina. The seed crystal has an average primary particle diameter of usually about 0.01 μm or more, preferably about 0.05 μm or more and usually about 0.5 μm or less. The seed crystal has a BET specific surface area of usually about 12 $m^2/g$ or more, preferably about 15 $m^2/g$ or more and usually about 150 $m^2/g$ or less. α-alumina used as the seed crystal may be prepared by, for example, a method in which aluminum hydroxide obtained by hydrolysis of aluminum isopropoxide is pre-calcined to obtain transition alumina, this is ground, then, calcined and ground. Iron oxide and chromium oxide may be prepared, for example, by a method for grounding a commercially available product.

The weight ratio of an α-alumina precursor to a seed crystal [=α-alumina precursor (in terms of $Al_2O_3$)/seed crystal (in terms of oxide of metal component)] is 75 to 1 wt %/25 to 99 wt %, preferably 75 to 50 wt %/25 to 50 wt %.

A method for preparation of the mixed powder on the step (II) may be conducted, for example, by procedures (II-1) an α-alumina precursor and a seed crystal are dry-mixed, (II-2) water is removed from a mixture containing an α-alumina precursor, seed crystal and water. Of these procedures, (II-2) is preferable. The procedure (II-1) may be conducted by using a ball mill or vibration mill. The procedure (II-2) may be conducted in the same manner as for the above-mentioned preparation of a mixture in the step (Ia).

It is advantageous that calcination in the step (II) is conducted, for example, by a method in which a powder is heated to calcination temperatures by using a tubular electric furnace, box-type electric furnace, tunnel furnace, far-infrared furnace, microwave furnace, shaft furnace, reflection furnace, rotary furnace, Roller Hearth furnace, and retained at the calcination temperature. Calcination may be conducted in batch-wise or continuous. It may be conducted in static mode or flow mode. Calcination temperature is usually about 600° C. or more, preferably about 700° C. or more and usually about 1000° C. or less, preferably about 950° C. or less. The temperature raising rate from room temperature to the calcination temperature is usually about 150° C./h to 500° C./h, and a duration in which, after reaching the calcination temperature, its temperature is retained, namely, the calcination time is usually about 10 minutes or more, preferably about 30 minutes or more and usually about 24 hours or less, preferably about 10 hours or less. Calcination is usually conducted under air or an inert gas ($N_2$, Ar). Calcination may also be conducted under air in which partial pressure of water vapor is regulated, for example, air in which partial pressure of water vapor is about 600 Pa or less An α-alumina particulate obtained by calcination of a mixture may be ground. It is advantageous that grinding is conducted, for example, by using a medium pulverizer such as a vibration mill and ball mill, or an airflow pulverizer such as jet mill. Further, an α-alumina particulate obtained by calcination or an α-alumina particulate subjected to the above-mentioned grinding may be classified.

α-alumina Particulate Obtained by the Production Method of the Present Invention The α-alumina particulate obtained by the production method of the present invention has a small amount of particulate having necking and an average primary particle diameter of usually about 10 nm or more, preferably about 20 nm or more and about 200 nm or less, preferably 100 nm or less, further preferably 60 nm or less.

This α-alumina particulate has an α-ratio of usually about 90% or more, preferably about 95% or more, and a BET specific surface area of usually about 13 $m^2/g$ or more, preferably about 15 $m^2/g$ or more and usually about 150 $m^2/g$ or less, preferably about 100 $m^2/g$ or less.

Since the α-alumina particulate obtained by the production method of the present invention has a small amount of particulate having necking and small average primary particle diameter, it is useful as a raw material for producing an α-alumina sintered body, especially a dense α-alumina sintered body. This α-alumina sintered body is suitable as a member for which high strength is required such as a cutting tool, bioceramics and bulletproof board. This α-alumina sintered body is, due to chemical stability such as excellent corrosion resistance and the like, used as a part of an apparatus for producing a semiconductor such as a wafer handler; an electronic part such as an oxygen sensor; a translucent tube such as a sodium lamp and metal halide lamp; or a ceramics filter. A ceramics filter is used for removal of solid components contained in a discharge gas, filtration of aluminum melt; filtration of foods (for example, beer); or selective permeation of a gas produced at petroleum processing or CO, $CO_2$, $N_2$, $O_2$, $H_2$ gas.

The α-alumina particulate obtained by the production method of the present invention is used as an additive, toner or resin filler for improving head cleaning property and friction resistance by addition thereof to an application layer of a magnetic media of application type. An α-alumina particulate can be used also as a polishing material. For example, a slurry obtained by dispersing an α-alumina particulate in a medium such as water is suitable for polishing of semiconductor CMP and polishing of a hard disk substrate. A polishing tape obtained by coating an α-alumina particulate on the surface of a tape is suitable for precise polishing of a hard disk and magnetic head.

Further, an α-alumina particulate is used as an additive for cosmetics, an additive to brake lining, or a catalyst carrier, and further used as a material of electric conductive sintered bodies and heat conductive sintered bodies.

EXAMPLES

The following examples will illustrate the present invention more in detail, but do not limit the scope of the invention. The properties of α-alumina particulate were measured according to the following methods.

α-ratio (%): It is calculated according to the following formula (1) using the peak intensity $I_{\alpha\ (012)}$ of an alumina α phase (012) plane and the peak intensity $I_{\theta\ (440)}$ of an alumina θ phase (440) plane from a diffraction spectrum obtained by using a powder X-ray diffractometer.

$$\alpha\text{-ratio }(\%) = I_{\alpha\ (012)}/(I_{\alpha\ (012)} + I_{\theta\ (440)}) \times 100(\%) \quad (1)$$

BET specific surface area ($m^2/g$): It was measured by a nitrogen adsorption method.

Degree of Necking: Among 20 or more of particulates on a transmission electron micrograph of α-alumina particulates, the ratio of those in form of agglomerated two or more primary particles was calculated. The measuring method will be explained by following model diagram.

In the diagram:

Particulates in form of no agglomerated primary particles: 18

Particulate in form of agglomerated two primary particles: 1

Particulate in form of agglomerated three primary particles: 1

In this case, degree of necking was 10% [=2/(18+1+1)]

Average primary particle diameter (μm): From a transmission electro micrograph of α-alumina particulates, the maximum diameter along constant direction of each primary particle of any 20 or more particulates was measured, and the average value of measured values was calculated.

EXAMPLE 1

Preparation of Seed Crystal Slurry

Aluminum hydroxide obtained by hydrolysis of aluminum isopropoxide was pre-calcined to obtain a transition alumina in which the main crystal phase is a θ and containing 3 wt % of α-alumina, then this transition alumina was ground by using a jet mill, to obtain a powder having a bulk density of 0.21 $g/cm^3$.

100 g of this powder was charged in a furnace of capacity of 8000 $cm^3$ [trade name: "Tubular atmosphere furnace", manufactured by MOTOYAMA K.K.], and dry air having a dew point of −15° C. (partial pressure of water vapor: 165

Pa) was introduced at a rate of 1 L/min into the furnace, and the powder was heated up to 1170° C. while maintaining the dew point of the atmosphere in the furnace at −15° C., and kept at this temperature for 3 hours, then, gradually cooled, obtaining an alumina substance thus calcined, then, this alumina calcined substance was ground by using a vibration mill (grinding medium: alumina), to obtain α-alumina having a BET specific surface area of 16 m$^2$/g.

20 parts by weight of this α-alumina was added to 80 parts by weight of nitric acid of pH 4, then, dispersion was conducted for 3 hours by using a ball mill with alumina beads having a diameter of 2 mm, to obtain a seed crystal slurry.

Production of α-alumina Particulate 375.13 g (1 mol) of aluminum nitrate hydrate [Al(NO$_3$)$_3$·9H$_2$O], manufactured by Wako Pure Chemical Industries Ltd., guaranteed reagent] was dissolved in pure water, giving a total volume of 1000 cm$^3$, to obtain 1155 g of an aluminum nitrate aqueous solution having a pH of 2.1. Of this solution, to 250 cm$^3$ of the aluminum nitrate aqueous solution was added 7.08 g of the seed crystal slurry obtained above (containing 1.42 g of α-alumina), then, 40 g of 25% ammonia water (manufactured by Wako Pure Chemical Industries Ltd., guaranteed reagent) was added at a feeding rate of 2 g/minute by using a micro rotary pump while stirring at 25° C., to obtain a slurry of pH 4 containing a hydrolysate of aluminum nitrate. This slurry was maintained at 25° C. for 24 hours, then, water was evaporated from the slurry by using a pressure-reduced drier, to obtain a dry powder. This powder contained a hydrolysate and 10 wt % of a seed crystal (α-alumina) in terms of Al$_2$O$_3$. This powder was ground by using a mortar, then, charged into an alumina crucible. The alumina crucible was placed in a box-type electric furnace. The powder was heated up to 950° C. at a rate of 300° C./h in air, and calcined at 950° C. for 3 hours, to obtain an α-alumina particulate. The properties of this α-alumina particulate are shown in Table 1. The photograph of the α-alumina particulate is shown in FIG. 1

Example 2

An α-alumina particulate was obtained by the same operation as in Example 1 except that the temperature when ammonia water was added was changed to 5° C. and the calcination temperature was changed to 935° C. in Example 1 [Production of α-alumina particulate]. In this example, the slurry had a pH of 4.2 in completion of addition of ammonia water. The properties of this α-alumina particulate are shown in Table 1.

Example 3

An α-alumina particulate was obtained by the same operation as in Example 1 except that the temperature when ammonia water was added was changed to 50° C. and the addition amount of ammonia water was changed to 43 g in Example 1 [Production of α-alumina particulate]. In this example, the slurry had a pH of 3.6 in completion of addition of ammonia water. The properties of the this α-alumina particulate are shown in Table 1.

Example 4

375.13 g of aluminum nitrate hydrate [Al(NO$_3$)$_3$·9H$_2$O, manufactured by Wako Pure Chemical Industries Ltd., guaranteed reagent] was dissolved in pure water, giving a total volume of 1000 cm$^3$, to obtain 1155 g of an aluminum nitrate aqueous solution. To 250 cm$^3$ of this aluminum nitrate aqueous solution was added 7.08 g of the seed crystal slurry obtained by the same operation as in Example 1 [Preparation of seed crystal slurry], then, 41 g of 25% ammonia water (manufactured by Wako Pure Chemical Industries Ltd., guaranteed reagent) was added at a feeding rate of 2 g/min by using a micro rotary pump while stirring at 25° C. In completion of addition, slurry of pH 4 containing a hydrolysate of aluminum nitrate was obtained. This slurry was charged into a bat made of stainless steel, the bat was placed in a thermostat, and water was evaporated by heating up to 100° C. in air, to obtain a dry powder containing a hydrolysate and a seed crystal. This powder was charged into an alumina crucible, the alumina crucible was placed in a box-type electric furnace. The powder was heated up to 950° C. at a rate of 300° C./h in air, and calcined at 950° C. for 3 hours, to obtain an α-alumina particulate. The properties of this α-alumina particulate are shown in Table 1.

Example 5

An α-alumina particulate was obtained by the same operation as in Example 1 except that the calcination temperature was changed to 1000° C. in Example 1 [Production of α-alumina particulate]. The properties of this α-alumina particulate are shown in Table 1.

Comparative Example 1

Figure 2:
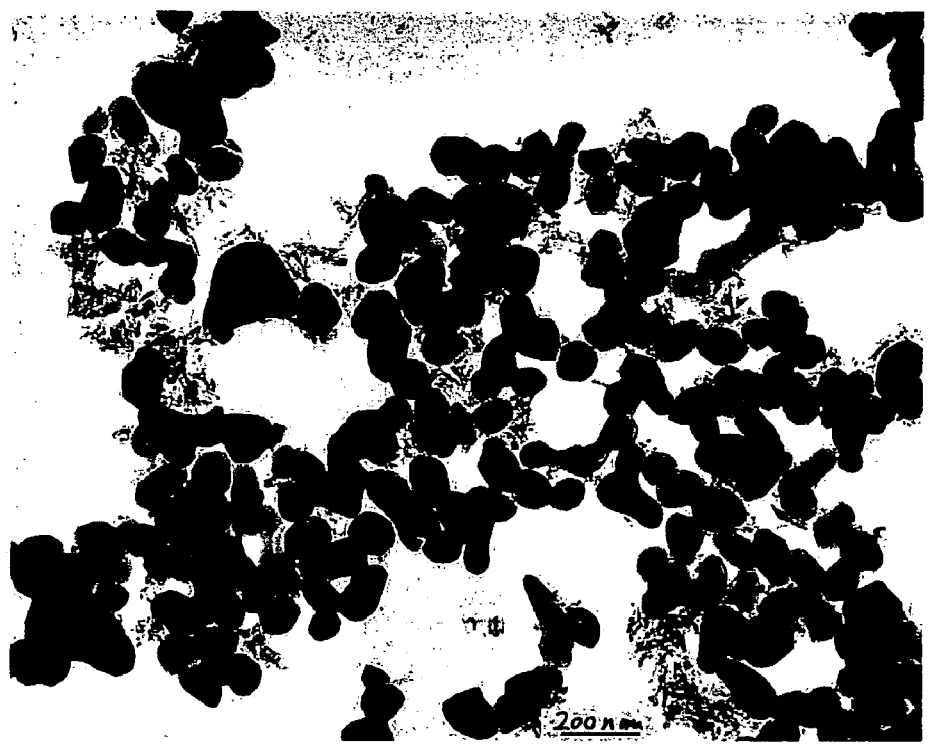
FIG. 2 shows a transmission electron micrograph of α-alumina obtained in Comparative Example 1.

375.13 g of aluminum nitrate hydrate [Al(NO$_3$)$_3$·9H$_2$O, manufactured by Wako Pure Chemical Industries Ltd., guaranteed reagent] was dissolved in pure water, giving a total volume of 1000 cm$^3$, to obtain 1155 g of an aluminum nitrate aqueous solution. Of these solution, to 250 cm$^3$ of this aluminum nitrate aqueous solution was added 7.08 g of the seed crystal slurry obtained by the same operation as in Example 1 [Preparation of seed crystal slurry], then, 34.1 g of 25% ammonia water (manufactured by Wako Pure Chemical Industries Ltd., guaranteed reagent) was added at a feeding rate of 2 g/minute by using a micro rotary pump while stirring at 75° C. In completion of addition, slurry of pH 3.9 containing a hydrolysate of aluminum nitrate was obtained. This slurry was maintained for 7 days, then, dried at 20° C. by using a rotary evaporator to obtain a dry powder. This powder was ground by using a mortar, then, charged into an alumina crucible. The alumina crucible was placed in a box-type electric furnace. The powder was heated up to 1000° C. at a rate of 300° C./h in air, and calcined at 1000° C. for 3 hours, to obtain an α-alumina particulate. The properties of this α-alumina particulate are shown in Table 1. The photograph of the α-alumina particulate is shown in FIG. 2.

Comparative Example 2

α-alumina was obtained by the same operation as in Example 1 except that the addition amount of 25 wt % ammonia water was changed to 48 g and the calcination temperature was changed to 940° C. in Example 1 [Production of α-alumina particulate]. In this example, the slurry had a pH of 7.9 in completion of addition of ammonia water. The properties of this α-alumina particulate are shown in Table 1.

Comparative Example 3

α-alumina was obtained by the same operation as in Example 1 except that the seed crystal slurry was not added and the calcination temperature was changed to 1025° C. in Example 1 [Production of α-alumina particulate]. The properties of this α-alumina particulate are shown in Table 1.

Example 6

Figure 3:
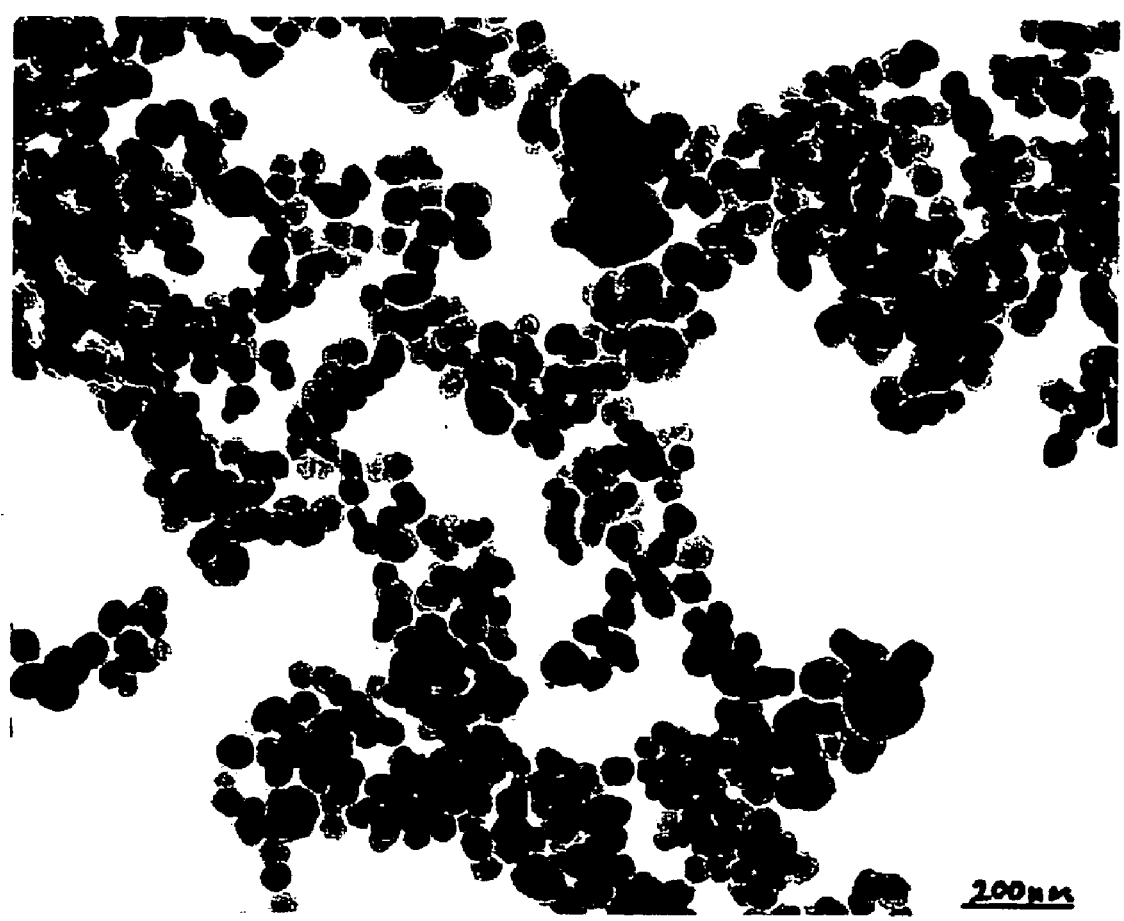
FIG. 3 shows a transmission electron micrograph of an α-alumina particulate obtained in Example 6.

375.13 g of aluminum nitrate hydrate [Al(NO$_3$)$_3$·9H$_2$O, manufactured by Wako Pure Chemical Industries Ltd., guaranteed reagent] was dissolved in pure water, giving a total volume of 1000 cm$^3$, to obtain 1155 g of an aluminum nitrate aqueous solution. To 250 cm$^3$ of this aluminum nitrate aqueous solution was added 27.32 g of the seed crystal slurry obtained by the same operation as in Example 1 [Preparation of seed crystal slurry], then, 40 g of 25% ammonia water [manufactured by Wako Pure Chemical Industries Ltd., guaranteed reagent] was added at a feeding rate of 2 g/minute by using a micro rotary pump while stirring at 25° C. In completion of addition, slurry of pH 4.1 containing a hydrolysate of aluminum nitrate was obtained. This slurry was maintained at 25° C. for 24 hours, then, dried at 20° C. by using pressure-reduced drier, to obtain a dry powder. This powder contained a hydrolysate and 30 wt % of seed crystal (α-alumina) in terms of Al$_2$O$_3$. This powder was ground by using a mortar, then, charged into an alumina crucible. The alumina crucible was placed in a box-type electric furnace. The powder was heated up to 940° C. at a rate of 300° C./h in air, and calcined at 940° C. for 3 hours, to obtain an α-alumina particulate. The properties of this α-alumina particulate are shown in Table 1. The photograph of the α-alumina particulate is shown in FIG. 3.

TABLE 1

| | Properties of α-alumina particulate | | | |
|---|---|---|---|---|
| | α-ratio (%) | BET specific surface area (m$^2$/g) | Degree of Necking (%) | Primary particle diameter (nm) |
| Example 1 | 97 | 15.4 | 0 | 68 |
| Example 2 | 97 | 17.8 | 5 | 66 |
| Example 3 | 97 | 19.6 | 10 | 72 |
| Example 4 | 98 | 15.9 | 5 | 64 |
| Example 5 | 97 | 12.6 | 15 | 76 |
| Comparative example 1 | 97 | 16.1 | 80 | 72 |
| Comparative example 2 | 98 | 16.8 | 85 | 113 |
| Comparative example 3 | 98 | 16.2 | 95 | 164 |
| Example 6 | 98 | 15.8 | 0 | 50 |

What is claimed is:

1. A method for producing an α-alumina particulate comprising steps of (Ia) and (Ib):
   (Ia) removing water from a mixture containing water, a seed crystal and a hydrolysate obtained by hydrolysis of an aluminum compound under conditions of a pH of 5 or less and a temperature of 35° C. or less,
   (Ib) calcining the resulted powder.

2. The method according to claim 1, wherein the aluminum compound in the step (Ia) is an aluminum salt or an aluminum alkoxide.

3. The method according to claim 2, wherein the aluminum salt is at least one selected from the group consisting of aluminum inorganic salts and aluminum organic salts.

4. The method according to claim 3, wherein the aluminum inorganic salt is at least one selected from the group consisting of aluminum nitrate, aluminum sulfate, aluminum ammonium sulfate and ammonium aluminum carbonate hydroxide.

5. The method according to claim 3, wherein the aluminum organic salt is at least one selected from the group consisting of aluminum oxalate, aluminum acetate, aluminum stearate, aluminum lactate and aluminum laurate.

6. The method according to claim 1, wherein a base is added to the aluminum compound before hydrolysis thereof in the step (Ia).

7. The method according to claim 1, wherein the hydrolysate and the seed crystal are dispersed in water in the step (Ia).

8. The method according to claim 1, wherein the weight ratio of hydrolysate (in terms of Al$_2$O$_3$)/seed crystal (in terms of oxide of metal component) is 99-1 wt %/1-99 wt % in the step (Ia).

9. The method according to claim 1, wherein the amount of water is 150-1000 parts by weight based on 100 parts by weight of the total amount of the hydrolysate and the seed crystal in the step (Ia).

10. The method according to claim 1, wherein the seed crystal in the step (Ia) is a metal oxide.

11. The method according to claim 10, wherein the metal oxide is at least one selected from the group consisting of alumina, iron oxide and chromium oxide.

12. The method according to claim 1, wherein calcination is conducted at 600-1000° C. in the step (Ib).

* * * * *